United States Patent [19]

Boyle et al.

[11] Patent Number: 4,652,426
[45] Date of Patent: Mar. 24, 1987

[54] WATER TUBES ARRANGED IN CROSS-LIKE PATTERN IN A FUEL ASSEMBLY

[75] Inventors: Raymond F. Boyle, Auburn, Calif.; Richard S. Miller, Murrysville; Carl A. Olson, Monroeville Boro, both of Pa.

[73] Assignee: Westinghouse Electric Corp., Pittsburgh, Pa.

[21] Appl. No.: 642,844

[22] Filed: Aug. 20, 1984

[51] Int. Cl.$^4$ .............................................. G21C 1/04
[52] U.S. Cl. ..................................... 376/352; 376/444
[58] Field of Search ................................ 376/444, 352

[56] References Cited

U.S. PATENT DOCUMENTS

| 3,802,995 | 4/1974 | Fritz | 376/444 |
| 4,348,355 | 9/1982 | Nylund | 376/444 |
| 4,478,786 | 10/1984 | Andersson | 376/444 |
| 4,526,744 | 7/1985 | Borrman | 376/444 |
| 4,526,745 | 7/1985 | Nylund | 376/444 |
| 4,526,746 | 7/1985 | Fredin | 376/444 |
| 4,560,532 | 12/1985 | Barry | 376/444 |
| 4,578,241 | 3/1986 | Borrman | 376/444 |

FOREIGN PATENT DOCUMENTS 1150423  7/1983  Canada .................. 376/444

Primary Examiner—Donald P. Walsh

[57] ABSTRACT

An improved nuclear fuel assembly includes a plurality of elongated water tubes arranged in a cross-like pattern spaced among a plurality of fuel rods for providing individual, spaced-apart coolant-moderator water flow paths lengthwise through the assembly. Some of the water tubes also function as tie rods interconnecting upper and lower tie plates of the fuel assembly.

5 Claims, 5 Drawing Figures

WATER TUBES ARRANGED IN CROSS-LIKE PATTERN IN A FUEL ASSEMBLY

CROSS REFERENCE TO RELATED APPLICATION

Reference is hereby made to the following co-pending U.S. application dealing with subject matter related to the present invention: entitled, "Nuclear Fuel Assembly" by R. F. Barry et al, U.S. Ser. No. 368,555, and filed 04-15-82.

BACKGROUND OF THE INVENTION

1. Field of the Invention

The present invention relates generally to fuel assemblies for a nuclear reactor and, more particularly, is concerned with a plurality of water tubes arranged in a cross-like pattern spaced among a plurality of fuel rods in a fuel assembly for providing coolant/moderator water flow paths longitudinally through the assembly without the necessity of altering the standard components and construction of the fuel assembly.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

A plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. The fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical fuel assembly in the cluster is ordinarily formed by a N by N array of the elongated fuel rods supported between upper and lower tie plates in laterally spaced-apart relation. An example of such a typical fuel assembly is described and illustrated in U.S. Pat. No. 3,802,995 to Fritz et al wherein a 7 by 7 array of spaced fuel rods is included in the fuel assembly. A problem commonly encountered in a fuel assembly of this type is that the fuel rods in the central region of the assembly may be undermoderated and overenriched. In order to increase the flow of moderator water, Fritz et al substituted one or more elongated empty rods for fuel rods in the central region of the array.

However, the use of one or more water moderator rods in the place of an equal number of fuel rods prevents the use of a full complement of fuel rods in the array with the likely result that a higher linear heat generation rate will be required. The provision of an elongated, centrally-disposed water cross in the form of a cruciform water flow channel such as described and illustrated in the U.S. patent application cross-referenced above sought to remedy the situation. The cruciform water flow channel provides a centrally-disposed, cross-shaped path for the flow of subcooled neutron moderator water within the channel along the lengths of adjacent fuel rods. The water flow channel eliminates the need for water moderator rods and enables use of a full complement of fuel rods.

Notwithstanding the improvements fostered by the cruciform water flow channel of the above-referenced patent application, it too has certain problems. While, the water flow channel provides moderator water in the central area of the fuel assembly, it does divide and isolate the fuel assembly into four separate sections or subgroups of fuel rods. To reduce the possibility of two phase flow instability between the sections, it is necessary to add cross flow holes through the channel. These holes complicate the overall structure of the cruciform water flow channel and result in a rather expensive solution to the problem.

Consequently, the need exists for an alternative approach to the channeling of moderator water to the inner fuel rods of the fuel assembly which is simplier and less costly than the cruciform water flow channel of the referenced patent application.

SUMMARY OF THE INVENTION

The present invention provides an arrangement of elongated water tubes designed to satisfy the aforementioned needs. The arrangement of the water tubes in a cross-like pattern among the fuel rods enhances moderation in the fuel rods in the center of the fuel assembly, while retaining all of the standard hardware of the assembly. It allows use of the standard tubular channel which surrounds the fuel rods of the assembly and therefore can be retrofitted to all fuel assemblies of existing boiling water type nuclear reactors. The use of water tubes allows custom orificing thereof for each respective fuel assembly and, in some arrays of fuel rods, enhances PCI (pellet clad interaction) failure resistance. Also, coolant/moderator water flow in the fuel assembly is more stable.

Accordingly, the present invention is directed to improvement of the fuel assemblies in a nuclear reactor. Each assembly contains upper and lower tie plates, a plurality of elongated fuel rods extending between the tie plates and disposed in side-by-side relationship so as to form an array of spaced fuel rods, and a tubular channel surrounding the fuel rods so as direct flow of coolant/moderator fluid along the fuel rods. The improvement comprises a plurality of water tubes arranged in a cross-like pattern spaced among the plurality of fuel rods of the fuel assembly. The water tubes provide a plurality of individual coolant/moderator water flow paths lengthwise through the assembly.

Although, like the prior cruciform water flow channel, the cross-like arrangement of water tubes of the present invention divides the array of fuel rods into a plurality of subgroups, unlike the cruciform water flow channel the spaced water tubes do not isolate the subgroups from one another. Thus, no specific provision needs to be made to provide coolant equalization flow between the subgroups. The spaced relationship between the individual water tubes in the cross-like pattern thereof inherently allows coolant cross flow between the fuel rod subgroups.

More particularly, the fuel rods of the assembly are divided into four N by N subarrays by the cross-like pattern of water tubes. The pattern of water tubes provides an intersecting row and column of water tubes interposed between the four subarrays of fuel rods. In addition to providing water flow paths, the water tube located at the intersection of the row and column of tubes also functions as a spacer capture rod, while alternate ones of the water tubes in the row and column thereof also function as tie rods connected to the upper and lower tie plates of the assembly.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figures 1, 2:
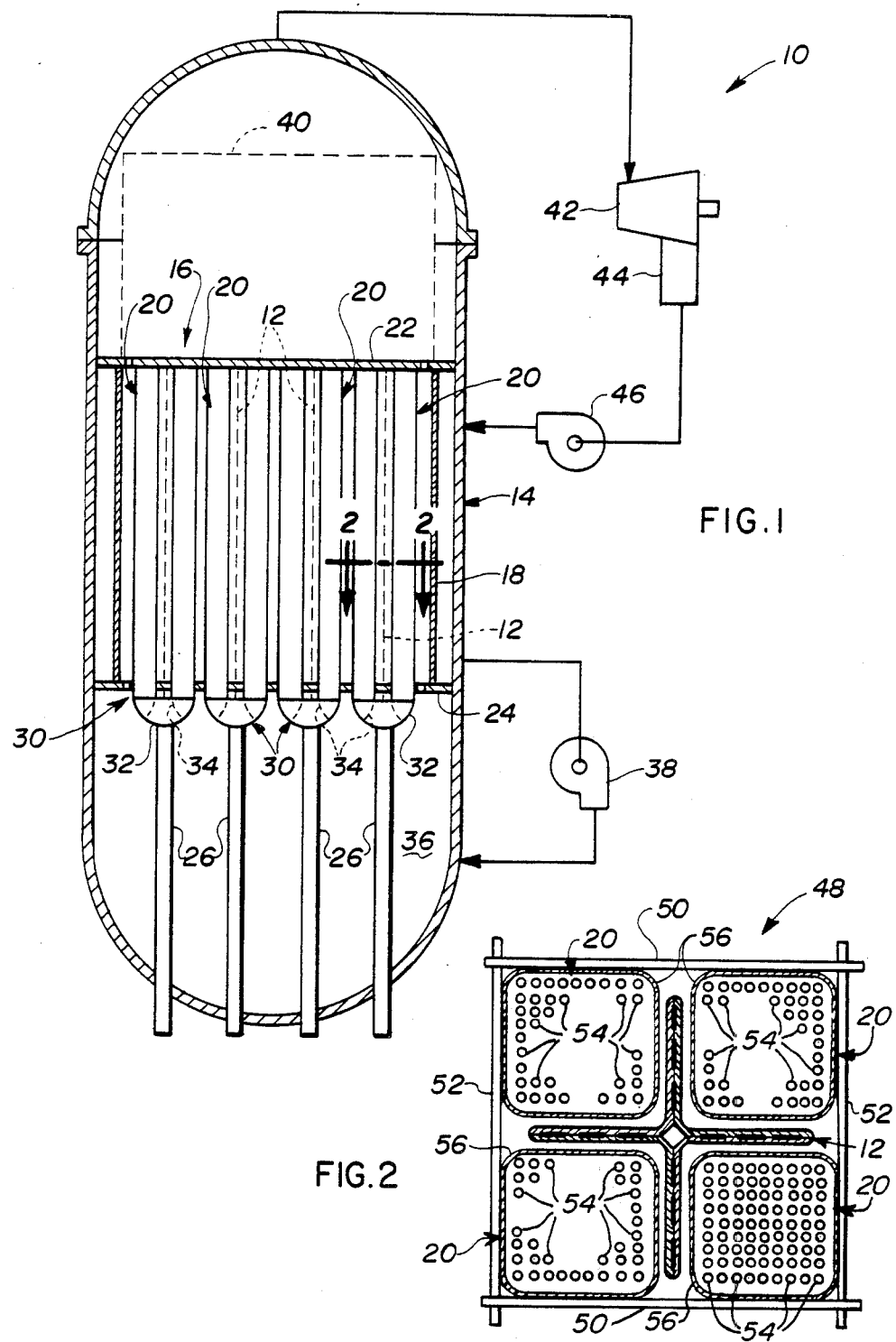
FIG. 1 is a schematic illustration of a boiling water nuclear power reactor (BWR) incorporating the improved fuel assemblies of the present invention.
FIG. 2 is an enlarged schematic plan view, partially in section, of a fuel cell of the core of the BWR taken along line 2—2 of FIG. 1.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown in simplified schematic form a boiling water nuclear power reactor (BWR), generally designated 10, in which the improvements of the present invention are incorporated. In its conventional form, the BWR 10 includes a pressure vessel 14 containing a nuclear reactor core 16 submerged in a coolant-moderator, such as light water. The core 16, which is surrounded by an annular shroud 18, includes a plurality of replaceable fuel assemblies 20 arranged in spaced relation between an upper core grid 22 and a lower core plate 24.

Below the core 16, a plurality of drive housing tubes 26 are disposed in alignment with the fuel assemblies 20. The housing tubes 26 contain control rod drive mechanisms (not shown) by operation of which a plurality of control rods 12 are selectively insertable among the fuel assemblies 20 from below the core 16 for controlling the reactivity of the core. Each of the housing tubes 26 is fitted with a fuel assembly support member 30. Each of the support members 30 is formed with sockets 32 for receiving nose pieces 34 of four adjacent fuel assemblies 20. The support members 30 and sockets 32 are formed with coolant passages or openings for communication with a coolant supply chamber 36 defined in the pressure vessel 10 below the core 16.

A coolant circulation pump 38 pressurizes the coolant in the supply chamber 36 from which the coolant is thus forced upwardly through openings in the support members 30 and sockets 32. The coolant is then forced through openings in the nose pieces 34 of the fuel assemblies 20 and therefrom upwardly through the fuel assemblies. A part of the coolant returns to the coolant circulation pump 38 and another part is converted to steam which passes through a separator-dryer arrangement 40, shown in dashed outline form, to a utilization device, such as a turbine 42. Condensate formed in a condenser 44 associated with the turbine 42 is returned as feedwater to the pressure vessel 10 by a pump 46.

Turning now to FIG. 2, there is shown a cluster of four fuel assemblies 20 surrounding the control rod 12 so as to form a fuel cell 48 of the reactor core 16. A number of these cells 48 make up the core 16. The four fuel assemblies 20 are laterally supported at their upper ends in the upper core support grid 22 formed in part by pairs of intersecting and interlocking beams 50 and 52. In a known arrangement, each of the replaceable fuel assemblies 20 is formed of a plurality of elongated fuel rods 54 supported in spaced side-by-side relationship and surrounded by a tubular flow channel 56 which directs the coolant upwardly among the fuel rods.

Figure 4:
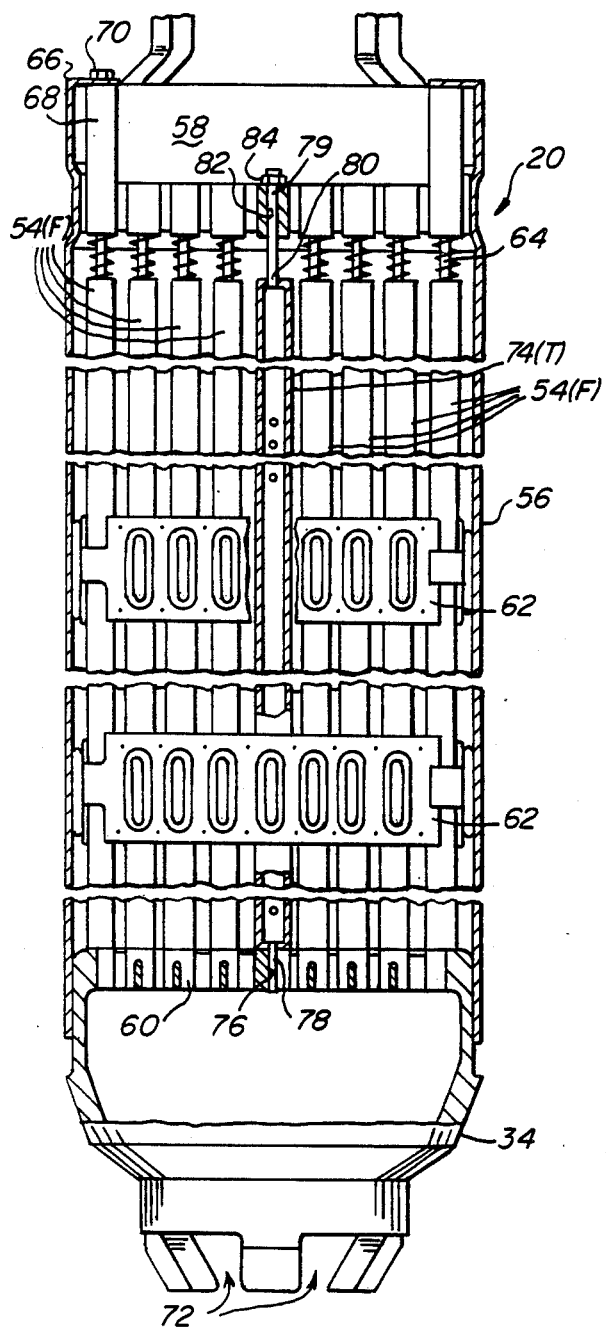
FIG. 4 is a side elevational view, partially in section and on a reduced scale, of the one fuel assembly taken along line 4—4 of FIG. 3.

As seen more clearly in FIG. 4, the fuel rods 54 of an exemplary one of the fuel assemblies 20 are supported between an upper tie plate 58 and a lower tie plate 60. Furthermore, the fuel rods 54 pass through a plurality of fuel rod spacers 62 which provide intermediate support to retain the elongated rods in spaced relation and restrain them from lateral vibration. Each of the fuel rods 54 is formed of an elongated tube containing fissible fuel and other material, ordinarily in pellet form, and being sealed at opposite ends by end plugs (not shown). The lower ends of the fuel rods register with and are supported within cavities (not shown) formed in the lower tie plate 60. Upper ends of the fuel rods are formed with extensions 64 which fit into cavities (not shown) in the upper tie plate 58.

The tubular flow channel 56 surrounding the fuel rods 54 of the fuel assembly 20 is of substantially square cross section and sized to form a sliding fit over the upper and lower tie plates 58,60 and the spacers 62 so that the channel can be readily mounted and removed. Fixed to the top end of the flow channel 56 is a tab 66 by which the channel is fastened to a standard 68 of the upper tie plate 58 by a bolt 70.

The lower tie plate 60 is formed with the nose pieces 34 adapted to support the fuel assembly 20 in the socket 32 in the fuel assembly support member 30 (FIG. 1). The end of this nose piece 34 is formed with openings 72 to receive the pressurized coolant from the supply chamber 36 (FIG. 1) so that it flows upwardly among the fuel rods 54.

Except for the specific configuration of the control rods 12 which comprises the invention disclosed in a co-pending U.S. patent application entitled "Improved Boiling Water Reactor Control Rod" by J. F. Wilson et al, filed Aug. 3, 1984 and assigned U.S. Ser. No. 637,183, the above-described basic components of the BWR 10 are known in the prior art, being disclosed in previously mentioned U.S. Pat. No. 3,802,995 and in earlier patents cited therein.

Improved Fuel Assemblies

Figure 3:
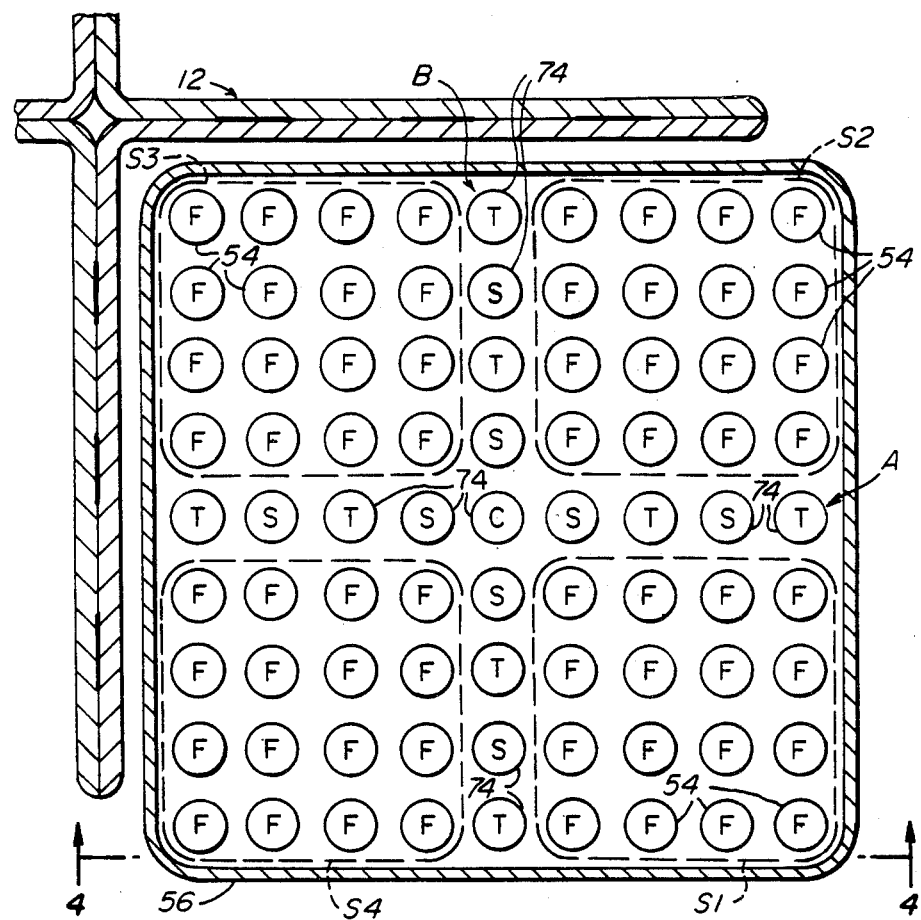
FIG. 3 is an enlarged schematic plan view, partially in section, of the one fuel assembly occupying the lower right hand portion of the fuel cell of FIG. 2, with an adjacent portion of the control rod of the fuel cell being illustrated in fragmentary form.

Referring now to FIG. 3, there is shown an exemplary one of the fuel assemblies 20 incorporating the preferred embodiment of the improvement provided by the present invention. The improvement comprises a plurality of water tubes 74, each of which is one of three types and is labelled accordingly in FIG. 3: a standard rod water tube S, a tie rod water tube T, or a spacer capture rod water tube C. The fuel rods 54 are each labelled F in FIG. 3. The water tubes S,T,C are arranged in a cross-like pattern spaced among the plurality of fuel rods of the assembly 20. Being hollow, the water tubes provide a plurality of individual coolant/-moderator water flow paths lengthwise through the assembly 20.

The cross-like pattern of water tubes S,T,C divides the array of fuel rods 54 into four N by N subarrays, shown in FIG. 3 enclosed in dashed line boxes designated S1 to S4. In the illustrated example, each subarray is formed of a 4 by 4 pattern of fuel rods. The pattern of water tubes S,T,C provides an intersecting row, generally designated A, and column, generally designated B, of water tubes interposed between the four subarrays S1, S2, S3 and S4. In addition to providing one of the water flow paths through the assembly 20, the water tube 74(C) located at the intersection of row A and column B of water tubes 74 also functions as a spacer capture rod, and is known per se in the aforementioned U.S. Pat. No. 3,802,995. Further, in addition to providing other of the water flow paths through the assembly 20, the water tubes 74(T) located at positions in the row A and column B which generally alternate with the positions of the standard water tubes 74(S) also function as tie rods connected to the upper and lower tie plates 58,60 of the assembly 20. In the aforementioned U.S. patent and patent application, this latter function was performed by fuel rods.

An example of one of the tie rod water tubes 74(T) is shown in FIG. 4. The cavity 76 in the lower tie plate 60 is formed with threads to threadably receive the lower end plug 78 of the tube T. The extension 79 of the upper end plug 80 is elongated sufficiently to pass through the cavity 82 in the upper tie plate 58 and is formed with threads to threadably receive a retaining nut 84. In this manner, the tie rod water tubes 74(T) interconnect the upper and lower tie plates 58,60 and form a unitary structure therewith.

Figure 5:
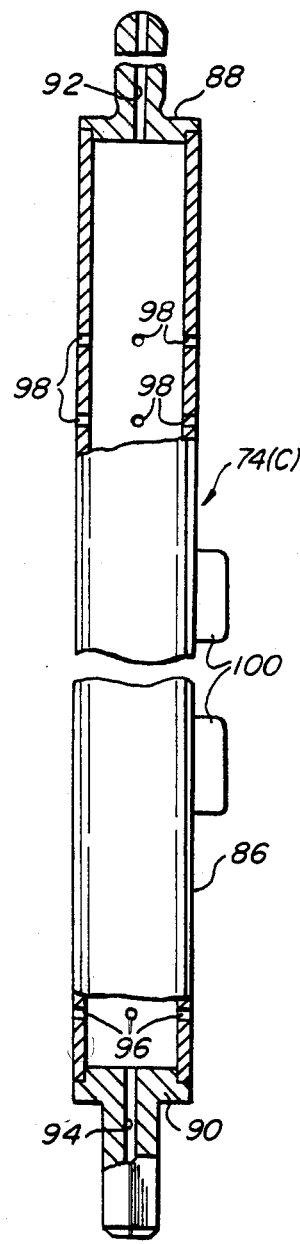
FIG. 5 is an enlarged elevational view of a spacer capture tube of the fuel assembly of FIG. 4.

The structure and feature of the spacer capture rod water tube 74(C) shown in FIG. 5 is substantially the same as that illustrated and described in aforementioned U.S. Pat. No. 3,802,995. It includes a continuous elongated tube body 86 formed of material suitable for use in a reactor core such as stainless steel or zirconium. Upper and lower end plugs 88,90 are attached to corresponding ends of the tube body 86. The end plugs are adapted to nonrotatably fit into cavities with matching shapes in the upper and lower tie plates 58,60. Central passages 92,94 are formed through the end plugs 88,90 to respectively provide an exit and entrance for coolant-moderator flow through the hollow tube body 86. The tube body 86 is also formed with a plurality of coolant inlet holes 96 in the lower part of the body and a plurality of coolant outlet holes 98 in the upper part of the body. Finally, the water tube 74(C) is formed with a plurality of radially extending, axially spaced fins or lugs 100, each of which is adapted to engage a respective one of the fuel rod spacers 62 by which the spacers 62 are retained in fixed axial positions.

The standard water tubes 74(S) are substantially identical to the spacer capture water tube 74(C) of FIG. 5 as described above except that the lugs 100 are omitted. In addition, the standard water tubes have springs (not shown), under a state of compression, disposed about their upper extensions the same as in the case of the fuel rods 54 seen in FIG. 4. Due to this resilient mounting arrangement, like the fuel rods the standard water tubes can undergo thermal expansion and contraction relative to the fixed mounting relationship of the upper and lower tie plates 58,60 relative to one another.

Thus, it is readily apparent that the water tubes 74 (T,C,S) in the cross-like pattern present individual, spaced apart paths for coolant flow through the center of the fuel assembly 20 and do not obstruct cross flow of coolant between the subarrays S1 through S4 of fuel rods 54 any more than do individual fuel rods within a given subarray. Especially important is the fact that the water tubes in the cross-like arrangement of the present invention accommodate the use of the same standard tubular flow channel 56 and upper and lower tie plates 58,60 as used in fuel assemblies in BWR reactors heretofore.

It is thought that the invention and many of its attendant advantages will be understood from the foregoing description and it will be apparent that various changes may be made in the form, construction and arrangement thereof without departing from the spirit and scope of the invention or sacrificing all of its material adavantages, the form hereinbefore described being merely a preferred or exemplary embodiment thereof.

We claim:

1. In a nuclear fuel assembly having upper and lower tie plates, a plurality of elongated fuel rods extending between said tie plates and disposed in side-by-side relationship so as to form an array of spaced fuel rods and a tubular channel surrounding said fuel rods so as to direct flow of coolant-moderator fluid along said fuel rods of said assembly, the improvement which comprises:

a plurality of elongated water tubes disposed between said upper and lower tie plates and arranged in a cross-like pattern spaced among said plurality of fuel rods so as to divide said array of fuel rods into subarrays thereof;

said water tubes defining a plurality of spaced-apart individual coolant-moderator fluid flow paths lengthwise through said assembly and being spaced apart from and structurally unconnected to one another along their lengths between said upper and lower tie plates so as to allow unobstructed coolant-moderator fluid cross flow between said subarrays of fuel rods at all levels along the lengths of said water tubes;

each of said water tubes being one of three different types with at least one water tube being from each of the three different types, such different types being a standard water rod, a tie rod, and a spacer capture rod, said water tubes of said tie rod type interconnecting said upper and lower tie plates.

2. The fuel assembly as recited in claim 1, wherein said water tubes of said tie rod type interconnect said upper and lower tie plates.

3. The fuel assembly as recited in claim 1, wherein said water tubes in said cross-like pattern provide an intersecting row and column of said water tubes which are interposed between and divide said array of fuel rods into said subarrays thereof.

4. The fuel assembly as recited in claim 3, wherein said water tube located at the intersection of said row and column of said water tubes is of the spacer capture rod type.

5. The fuel assembly as recited in claim 3, wherein said water tubes located in said row and column thereof other than at their intersection generally alternate between said tie rod type and said standard rod type.

* * * * *